(12) United States Patent
Ogasawara et al.

(10) Patent No.: US 10,280,341 B2
(45) Date of Patent: *May 7, 2019

(54) ADHESIVE AGENT COMPOSITION AND ADHESIVE AGENT

(71) Applicant: DAI-ICHI KOGYO SEIYAKU CO., LTD., Kyoto-shi, Kyoto (JP)

(72) Inventors: Asako Ogasawara, Kyoto (JP); Shigeru Kigasawa, Kyoto (JP); Masatake Joyabu, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/517,675

(22) PCT Filed: Oct. 28, 2015

(86) PCT No.: PCT/JP2015/080400
§ 371 (c)(1),
(2) Date: Apr. 7, 2017

(87) PCT Pub. No.: WO2016/076115
PCT Pub. Date: May 19, 2016

(65) Prior Publication Data
US 2017/0306192 A1    Oct. 26, 2017

(30) Foreign Application Priority Data

Nov. 11, 2014    (JP) .................... 2014-229347

(51) Int. Cl.
*C08F 2/24* (2006.01)
*C08F 220/30* (2006.01)
*C09J 4/00* (2006.01)
*C09J 11/06* (2006.01)
*C09J 125/18* (2006.01)
*C09J 157/04* (2006.01)

(52) U.S. Cl.
CPC .............. *C09J 125/18* (2013.01); *C08F 2/24* (2013.01); *C09J 4/00* (2013.01); *C09J 11/06* (2013.01); *C09J 157/04* (2013.01); *C08F 2220/306* (2013.01)

(58) Field of Classification Search
CPC ........ C09J 125/18; C09J 11/06; C09J 157/04; C09J 4/00; C08F 2/24; C08F 2220/306
See application file for complete search history.

(56) References Cited

U.S. PATENT DOCUMENTS

| 2009/0105383 A1* | 4/2009 | Davis ...................... C08K 5/06 524/141 |
| 2014/0323753 A1 | 10/2014 | Ogasawara et al. |
| 2015/0011790 A1 | 1/2015 | Ogasawara et al. |
| 2017/0327602 A1* | 11/2017 | Ogasawara ............... C08F 2/24 |

FOREIGN PATENT DOCUMENTS

| EP | 2 769 996 | 8/2014 |
| EP | 3 017 864 | 5/2016 |
| JP | 63-183998 | 7/1988 |
| JP | 8-41113 | 2/1996 |
| JP | 2013-245239 | 12/2013 |
| WO | 2013/108588 | 7/2013 |

OTHER PUBLICATIONS

International Search Report, dated Dec. 1, 2015 in corresponding International Application No. PCT/JP2015/080400.
Office Action dated May 28, 2018 in Chinese Patent Application No. 201580059037.4, with English-language translation.
Office Action dated May 3, 2018 in Taiwanese Application No. 104137223, with English translation.
Extended European Search Report dated Jun. 6, 2018 in European Application No. 15859019.0.

* cited by examiner

*Primary Examiner* — Patrick D Niland
(74) *Attorney, Agent, or Firm* — Wenderoth, Lind & Ponack, L.L.P.

(57) ABSTRACT

The present invention relates to an adhesive agent composition, containing an aqueous resin dispersion obtained by subjecting a polymerizable compound (C) containing a compound (C1) having a carbon-carbon unsaturated bond to an emulsion polymerization in the presence of a surfactant (A) and a surfactant (B) free from a radical-polymerizable substituent.

4 Claims, No Drawings

ADHESIVE AGENT COMPOSITION AND ADHESIVE AGENT

TECHNICAL FIELD

The present invention relates to an adhesive agent composition, and more specifically relates to an adhesive agent composition containing an aqueous resin dispersion obtained by subjecting a polymerizable compound to emulsion polymerization by using a specific surfactant, and an adhesive agent obtained from the composition.

BACKGROUND ART

In recent years, in consideration of the global environment and the work environment, transition from a solvent base to an aqueous base progresses in the adhesive agent, and the required performance of an aqueous resin dispersion, which is a raw material therefor, has increased. In particular, an emulsion polymerization method has been used as a useful method for producing the aqueous resin dispersion.

However, since the emulsion polymerization method uses a surfactant, there are problems of the occurrence of foam, the decrease in water resistance of adhesive agent composition, the elution of surfactant from the adhesive agent composition, and the like. Therefore, in Patent Documents 1 and 2, emulsion polymerization methods using a surfactant having a polymerizable group are disclosed.

PRIOR ART DOCUMENT

Patent Document

Patent Document 1: JP-A-63-183998
Patent Document 2: JP-A-8-41113

SUMMARY OF THE INVENTION

Problems that the Invention is to Solve

However, the methods described in Patent Documents 1 and 2 can suppress the occurrence of foam, but there is a problem in which wettability to a base material is poor and also it is hard to say that the water resistance adhesive strength is sufficient. Further, it has been found that, in order to improve the wettability to a base material, when the surfactant having a polymerizable group described in Patent Documents 1 and 2 and a surfactant having no polymerizable group are used in combination, the occurrence of foam and the decrease in the water resistance adhesive strength take place and the advantage of using the surfactant having a polymerizable group is lost.

Therefore, the present invention provides an adhesive agent composition, which suppresses the occurrence of foam, is excellent in the wettability to a base material, and has high water resistance adhesive strength.

Means for Solving the Problems

In order to solve the problems described above, the adhesive agent composition according to the present invention contains an aqueous resin dispersion obtained by subjecting a polymerizable compound (C) containing a compound (C1) having a carbon-carbon unsaturated bond to an emulsion polymerization in the presence of a surfactant (A) represented by a general formula (I) shown below and a surfactant (B) free from a radical-polymerizable substituent.

[Chem. 1]

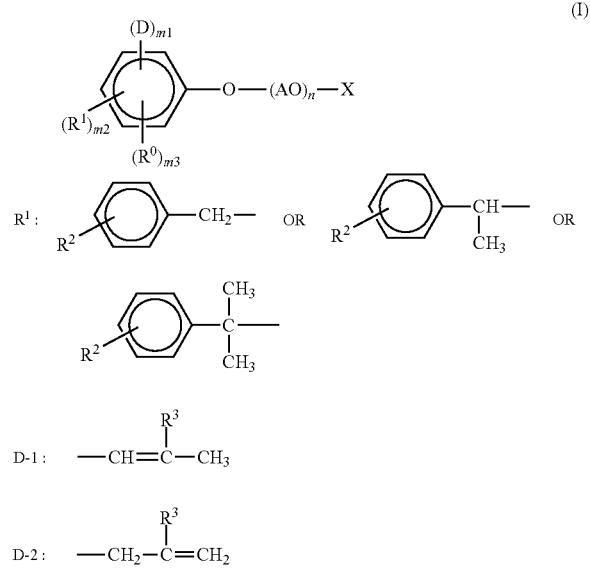

In the general formula (I), $R^0$ represents an alkyl group having a carbon number of from 1 to 4, $R^1$ represents at least one group selected from substituents represented by structural formulae described above, in these structural formulae, $R^2$ represents a hydrogen atom or a methyl group, D represents a substituent represented by general formula D-1 or D-2 shown above, in these structural formulae, $R^3$ represents a hydrogen atom or a methyl group, m1 represents a number of from 1 to 2, m2 represents a number of from 1 to 3, m3 represents a number of 0 or 1, AO represents an oxyalkylene group having a carbon number of from 2 to 4, n is an average addition molar number of alkylene oxide and represents a number in a range of from 0 to 1,000, and X represents a group selected from —$(CH_2)_a$—$SO_3M$, —$(CH_2)_b$—COOM, —$PO_3M_2$, —$P(Z)O_2M$, and —CO—$CH_2$—CH($SO_3M$)-COOM, in these structural formulae, a and b each represents a number of from 0 to 4, Z represents a residue obtained by eliminating X from the general formula (I), and M each represents a hydrogen atom, an alkali metal atom, an alkaline earth metal atom, an alkyl ammonium, an alkanol ammonium, or an ammonium.

According to the constitution described above, the adhesive agent composition, which suppresses the occurrence of foam, is excellent in the wettability to a base material, and has high adhesive strength, is achieved.

In the aqueous resin dispersion having the constitution described above, a ratio of the surfactant (B) is preferably from 5 to 80 parts by mass based on 100 parts by mass of the surfactant (A).

According to the constitution described above, the adhesive agent composition, which further suppresses the occurrence of foam, is more excellent in the wettability to a base material, and has higher adhesive strength, is achieved.

Advantage of the Invention

According to the present invention, an adhesive agent composition, which suppresses the occurrence of foam, is excellent in the wettability to a base material and has high adhesive strength, is obtained.

MODE FOR CARRYING OUT THE INVENTION

Preferred embodiments of the present invention will be described hereinafter. In the present invention, "(meth)acryl" means "acryl" or "methacryl", "(meth)acrylate" means "acrylate" or "methacrylate", and "(meth)allyl" means "allyl" or "methallyl".

The adhesive agent composition of the present embodiment contains an aqueous resin dispersion obtained by subjecting a polymerizable compound (C) containing a compound (C1) having a carbon-carbon unsaturated bond to an emulsion polymerization in the presence of a surfactant (A) represented by general formula (I) shown below and a surfactant (B) free from a radical-polymerizable substituent.

[Chem. 2]

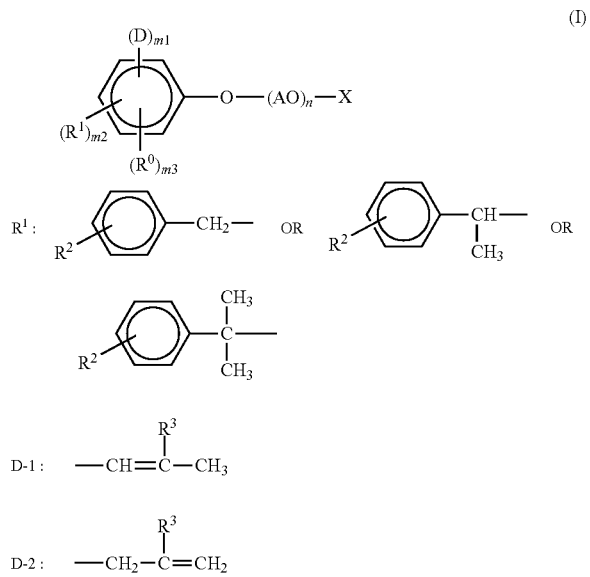

The surfactant (A) in the present invention is one represented by the general formula (I) described above. In the general formula (I), $R^0$ represents an alkyl group having a carbon number of from 1 to 4, $R^1$ represents at least one group selected from the substituents represented by structural formulae described above, in the structural formulae, $R^2$ represents a hydrogen atom or a methyl group, D represents the substituent represented by general formula D-1 or D-2 described above, in the structural formulae, $R^3$ represents a hydrogen atom or a methyl group, m1 represents a number of from 1 to 2, m2 represents a number of from 1 to 3, and m3 represents a number of 0 or 1. Here, m1, m2 and m3 satisfy $2 \leq (m1+m2+m3) \leq 5$.

Further, AO represents an oxyalkylene group having a carbon number of from 2 to 4, n is an average addition molar number of alkylene oxide and represents a number in a range of from 0 to 1,000.

X represents a group selected from —$(CH_2)_a$—$SO_3M$, —$(CH_2)_b$—COOM, —$PO_3M_2$, —$P(Z)O_2M$, and —CO—$CH_2$—$CH(SO_3M)$-COOM, in the structural formulae, a and b each represents a number of from 0 to 4, Z represents a residue obtained by eliminating X from the general formula (I), and M each represents a hydrogen atom, an alkali metal atom, an alkaline earth metal atom, an alkyl ammonium, an alkanol ammonium, or an ammonium.

The substituent $R^0$ in the general formula (I) described above represents an alkyl group having a carbon number of from 1 to 4. The substituent $R^0$ is preferably an alkyl group having a carbon number of from 1 to 2. The substituent $R^1$ in the general formula (I) described above represents at least one group selected from the substituents represented by the structural formulae described above. The substituent $R^1$ described above is preferably the substituent represented by the structural formula described in the center of the structural formulae described above. m2 is an average substitution number of the substituent $R^1$ and m2 is a number of from 1 to 3. m2 is preferably from 1.05 to 1.8.

The substituent D in the general formula (I) described above is one represented by D-1 or D-2. Specifically, the substituent represented by D-1 is a 1-propenyl group or a 2-methyl-1-propenyl group, and the substituent represented by D-2 is a (meth)allyl group. The substituent D is preferably substituted into an ortho position (2-position or 6-position) of the general formula (I). m1 is an average substitution number of the substituent D and is a number of from 1 to 2. From the standpoint of further suppressing the occurrence of foam, being more excellent in the wettability to a base material, and having higher adhesive strength, m1 is preferably from 1 to 1.5. Moreover, from the standpoint of further suppressing the occurrence of foam, being more excellent in the wettability to a base material, and having higher adhesive strength, it is preferred that the substituent D includes D-1, and it is more preferred that the substituent D includes D-1 alone or a ratio of D-1 to D-2 (D-1)/(D-2) is 2 or more.

AO in the general formula (I) described above is an oxyalkylene group having a carbon number of from 2 to 4, and includes, for example, an oxyalkylene group having a carbon number of 2, for example, an oxyethylene group, an oxyalkylene group having a carbon number of 3, for example, an oxypropylene group, an oxy-1-methylethylene group or an oxy-2-methylethylene group, and an oxyalkylene group having a carbon number of 4, for example, an oxybutylene group, an oxy-1-methylpropylene group, an oxy-2-methylpropylene group, an oxy-3-methylpropylene group, an oxy-1,2-dimethylethylene group, or an oxy-1-ethylethylene group.

As to the AO, from the standpoint that polymerization stability, chemical stability and mechanical stability are more excellent, it is preferred to contain an oxyalkylene group having a carbon number of 2, and it is more preferred to contain an oxyethylene group. From the similar standpoint, the content of the oxyalkylene group having a carbon number of 2 is preferably from 50 to 100% by mole, more preferably from 70 to 100% by mole, in the AO.

n in the general formula (I) described above is an average addition molar number of alkylene oxide and is a number of from 0 to 1,000. In this range, from the standpoint that polymerization stability, chemical stability and mechanical stability are more excellent, it is preferably a number larger than 0, more preferably 1 or more, and still more preferably 3 or more. From the standpoint that polymerization stability is more excellent and the average particle diameter is more easily controlled, it is preferably 100 or less, more preferably 70 or less, and still more preferably 50 or less.

X in the general formula (I) described above is a group selected from —$(CH_2)_a$—$SO_3M$, —$(CH_2)_b$—COOM, —$PO_3M_2$, —$P(Z)O_2M$, and —CO—$CH_2$—$CH(SO_3M)$-COOM. In the structural formulae, a and b each represents a number of from 0 to 4, and Z represents a residue obtained by eliminating X from the general formula (I) described above.

M each is a hydrogen atom, an alkali metal atom, an alkaline earth metal atom, an alkyl ammonium, an alkanol ammonium, or an ammonium. The alkali metal atom includes, for example, lithium, sodium and potassium. The alkaline earth metal atom includes, for example, magnesium and calcium. The alkyl ammonium includes, for example, monomethyl ammonium, dimethyl ammonium, trimethyl ammonium, monoethyl ammonium, diethyl ammonium, triethyl ammonium, monopropyl ammonium, dipropyl ammonium, and tripropyl ammonium. The alkanol ammonium includes, for example, monoethanol ammonium, diethanol ammonium and triethanol ammonium.

Since the polymerization stability is more excellent, X is preferably —(CH$_2$)$_a$—SO$_3$M, —PO$_3$M$_2$ or —P(Z)O$_2$M, and more preferably —SO$_3$M, —PO$_3$M$_2$ or —P(Z)O$_2$M.

The production method of the surfactant (A) represented by the general formula (I) described above is not particularly limited, and various methods can be adopted. For example, a compound in which X in the general formula (I) is a hydrogen atom is obtained by subjecting a phenol derivative having a polymerizable group in an aromatic ring to addition polymerization with alkylene oxide. Subsequently, X is substituted with at least one group selected from —(CH$_2$)$_a$—SO$_3$M, —(CH$_2$)$_b$—COOM, —PO$_3$M$_2$, —P(Z)O$_2$M, and —CO—CH$_2$—CH(SO$_3$M)-COOM according to known methods, thereby obtaining the surfactant (A) represented by the general formula (I).

The method of producing, among the phenol derivatives having a polymerizable group in an aromatic ring, a phenol derivative having a polymerizable group in an aromatic ring, in which the substituent D is D-2, includes, for example, (s1-1) a method of subjecting a phenol derivative having a substituent in an aromatic ring and an allyl halide to a reaction, and (s1-2) a method of subjecting a phenol and an allyl halide to a reaction, and then introducing a substituent into the aromatic ring.

Hereinafter, as to the method of (s1-1), a case where a styrenated phenol is used as the phenol derivative having a substituent in an aromatic ring is described as an example. Hereinafter, a styrenated (alkyl) phenol means a styrenated phenol or a styrenated alkylphenol.

In the general formula (I) described above, as to the polymerizable unsaturated group represented by the substituent D, as described above, D-1 is a 1-propenyl group or a 2-methyl-1-propenyl group, and D-2 is an allyl group or a methallyl group. Among them, the (meth)allyl group as D-2 can be introduced by a (meth)allylation reaction of a styrenated (alkyl) phenol. Specifically, for example, a (meth) allyl halide and a styrenated (alkyl) phenol are allowed to react in the presence of a basic substance, for example, sodium hydroxide or potassium hydroxide, and then further subjected to a reaction at 80 to 120° C., thereby obtaining a (meth)allyl styrenated (alkyl) phenol. Here, by adjusting the use amounts of the (meth)allyl halide or basic substance to the styrenated (alkyl) phenol or the reaction temperature, m1 in the general formula (I) can be set to the desired number.

Reaction formulae (i) to (iv) shown below are reaction formulae in the case where styrenated phenol is used as the styrenated (alkyl) phenol, allyl chloride is used as the (meth)allyl halide, and sodium hydroxide is used as the basic substance, as an example. In the reaction formulae (i) and (ii), a compound in which one allyl group is introduced is obtained, and in the reaction formulae (iii) and (iv), a compound in which two allyl groups are introduced is obtained.

[Chem. 3]

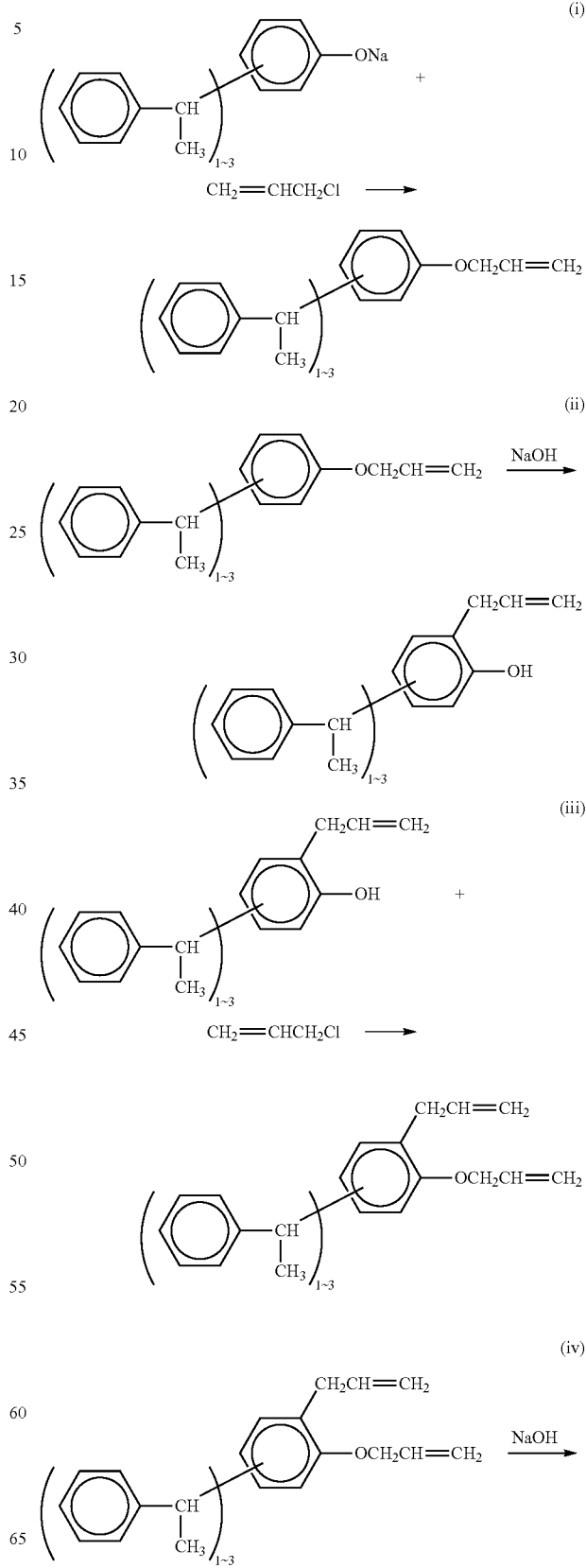

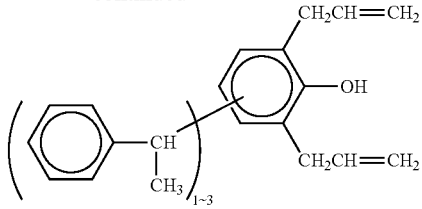

The method of producing, among the phenol derivatives having a polymerizable group in an aromatic ring, a phenol derivative having a polymerizable group in an aromatic ring, in which the substituent D is D-1, includes, for example, (s2-1) a method of subjecting the reaction product obtained by the (s1-1) to a Claisen rearrangement reaction in the presence of an alkali catalyst, and (s2-2) a method of subjecting a phenol and an allyl halide to a reaction, then to a Claisen rearrangement reaction in the presence of an alkali catalyst, and thereafter introducing a substituent into the aromatic ring. Here, it is not necessary that a reaction rate of the Claisen rearrangement reaction is 100% and a (meth) allyl group may be remained. Further, the Claisen rearrangement reaction may be performed simultaneously with the introduction of an oxyalkylene group $(AO)_n$ described below.

Next, a method for introducing an oxyalkylene group $(AO)_n$ into a phenol derivative having a polymerizable group in an aromatic ring is described. The method for introducing an oxyalkylene group $(AO)_n$ includes, for example, a method of adding a predetermined amount of alkylene oxide to a phenol derivative having a polymerizable group in an aromatic ring by a known method. According to the method, a compound in which X in the general formula (I) is a hydrogen atom is obtained.

Subsequently, X in the resulting compound in which X in the general formula (I) is a hydrogen atom is substituted with at least one group selected from $—(CH_2)_a—SO_3M$, $—(CH_2)_b—COOM$, $—PO_3M_2$, $—P(Z)O_2M$, and $—CO—CH_2—CH(SO_3M)\text{-}COOM$, thereby obtaining the surfactant (I) of the present invention. A method for the substitution reaction is not particularly limited, and it can be performed by a known method.

The method for substituting X with $—SO_3M$ (case in which a in $—(CH_2)_a—SO_3M$ is 0) includes, for example, a method of subjecting a compound in which X in the general formula (I) is a hydrogen atom to a reaction with sulfamic acid, sulfuric acid, sulfuric anhydride, fuming sulfuric acid, or chlorosulfonic acid. According to the method, the surfactant (A) in which M is a hydrogen atom is obtained.

The method for substituting X with $—(CH_2)_aSO_3M$ (in which a is from 1 to 4) includes, for example, a method of subjecting a compound in which X in the general formula (I) is a hydrogen atom to a reaction with propanesultone or butanesultone. According to the method, the surfactant (A) in which M is a hydrogen atom is obtained.

The method for substituting X with $—(CH_2)_b—COOM$ includes, for example, a method of oxidizing a compound in which X in the general formula (I) is a hydrogen atom or an alkali metal atom, and a method of subjecting a compound in which X in the general formula (I) is a hydrogen atom or an alkali metal atom to a reaction with a mono-halogenated acetic acid. Further, a method of subjecting a compound in which X in the general formula (I) is a hydrogen atom or an alkali metal atom to a reaction with acrylonitrile or an acrylic acid ester and then to saponification with alkali.

The method for substituting X with $—PO_3M_2$ or $—P(Z)O_2M$ includes, for example, a method of subjecting a compound in which X in the general formula (I) is a hydrogen atom to a reaction with phosphorus pentoxide, polyphosphoric acid, orthophosphoric acid, or phosphorus oxychloride. According to the method, the surfactant (A) in which M is a hydrogen atom is obtained. Here, the case of $—PO_3M_2$ is a monoester compound, and the case of $—P(Z)O_2M$ is a diester compound, and the surfactant (A) is ordinarily obtained as a mixture thereof. According to the present invention, the mixture may be used as it is or may be subjected to a separation and only either one may be used. A method for increasing a content ratio of the monoester compound includes a method in which the reaction described above is performed in the presence of water.

The method for substituting X with $—CO—CH_2—CH(SO_3M)\text{-}COOM$ includes, for example, a method of subjecting a compound in which X in the general formula (I) is a hydrogen atom to a reaction with maleic anhydride to perform mono-esterification, and then further subjecting to a reaction with anhydrous sodium sulfite. According to the method, the surfactant (A) in which M is a hydrogen atom is obtained.

The production method of the surfactant (A) in which M is an alkali metal atom, an alkaline earth metal atom, an alkyl ammonium, an alkanol ammonium, or an ammonium includes, for example, a method of subjecting the surfactant (A) in which M is a hydrogen atom obtained according to the production method described above to a reaction with an alkali metal hydroxide, an alkaline earth metal hydroxide, an alkyl amine, an alkanolamine, or ammonia.

As the surfactant (B) free from a radical-polymerizable substituent in the present invention, a nonionic surfactant, an anionic surfactant or a cationic surfactant can be used.

The nonionic surfactant includes, for example, a polyoxyalkylene alkyl phenyl ether, a polyoxyalkylene alkyl ether, a polyoxyalkylene styrenated phenyl ether, a polyoxyalkylene benzylated phenyl ether, a polyoxyalkylene cumyl phenyl ether, a fatty acid polyethylene glycol ether, a polyoxyalkylene sorbitan fatty acid ester, and a sorbitan fatty acid ester.

The anionic surfactant includes, for example, a fatty acid soap, a rosin acid soap, an alkyl sulfonic acid salt, an alkylaryl sulfonic acid salt, an alkyl sulfuric acid ester salt, and an alkyl sulfosuccinic acid salt. Further, a sulfuric acid ester salt, a phosphoric acid ester salt, an ether carboxylic acid salt, a sulfosuccinic acid salt, or the like of the nonionic surfactants described above are also exemplified. The salt includes, for example, an alkali metal salt, for example, lithium, sodium or potassium, an alkaline earth metal salt, for example, magnesium or calcium, an alkyl ammonium salt, for example, monomethyl ammonium, dimethyl ammonium, trimethyl ammonium, monoethyl ammonium, diethyl ammonium, triethyl ammonium, monopropyl ammonium, dipropyl ammonium, or tripropyl ammonium, an alkanol ammonium salt, for example, monoethanol ammonium, diethanol ammonium or triethanol ammonium, and an ammonium salt.

The cationic surfactant includes, for example, a stearyltrimethylammonium salt, a cetyltrimethylammonium salt, a lauryltrimethylammonium salt, a dialkyldimethylammonium salt, an alkyldimethylbenzylammonium salt, and an alkyldimethylhydroxyethylammonium salt. The salt includes, for example, an alkylsulfate salt, for example, ethyl sulfate, and a chloride.

Among them, since the chemical stability is more excellent, a nonionic surfactant is preferred, and a polyoxyalkylene alkyl phenyl ether, a polyoxyalkylene alkyl ether and a polyoxyalkylene styrenated phenyl ether are more preferred.

The polymerizable compound (C) in the present invention contains a compound (C1) having a carbon-carbon unsaturated bond. The compound (C1) having a carbon-carbon unsaturated bond includes, for example, an α-β unsaturated carboxylic acid, an α-β unsaturated carboxylic acid ester, an α-β unsaturated amide and, an unsaturated hydrocarbon.

The α-β unsaturated carboxylic acid includes, for example, (meth)acrylic acid, acrylic acid dimer, crotonic acid, itaconic acid, and maleic acid.

The α-β unsaturated carboxylic acid ester includes, for example, a (meth)acrylic acid monoalkyl ester, for example, methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, cyclohexyl (meth)acrylate, isooctyl (meth)acrylate, n-octyl (meth)acrylate, nonyl (meth)acrylate, isononyl (meth)acrylate, decyl (meth)acrylate, isodecyl (meth)acrylate, undecyl (meth)acrylate, isoundecyl (meth)acrylate, dodecyl (meth)acrylate, or isododecyl (meth)acrylate; a polyol poly(meth)acrylate, for example, ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, 1,3-butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylolpropane tri(meth)acrylate, tetramethylolmethane tri(meth)acrylate, tetramethylolmethane tetra(meth)acrylate, glycerol methacrylate acrylate, or glycerol di(meth)acrylate; a (meth)acrylic acid fluoroalkyl ester, for example, trifluoroethyl (meth)acrylate, tetrafluoropropyl (meth)acrylate or octafluoropentyl (meth)acrylate; a (meth)acrylic acid hydroxyalkyl ester, for example, 2-hydroxyethyl (meth)acrylate or 2-hydroxypropyl (meth)acrylate; an epoxy group-containing (meth)acrylic acid ester, for example, glycidyl (meth)acrylate or allyl glycidyl ether; an alkoxysilyl group-containing (meth)acrylic acid ester, for example, γ-(meth)acryloxyethyltrimethoxysilane, γ-(meth)acryloxyethyltriethoxysilane, γ-(meth)acryloxypropyltrimethoxysilane, γ-(meth)acryloxypropyltriethoxysilane, γ-(meth)acryloxypropylmethyldimethoxysilane, γ-(meth)acryloxypropyldimethylmethoxysilane, γ-(meth)acryloxypropylmethyldiethoxysilane, γ-(meth)acryloxypropyldimethylethoxysilane, γ-(meth)acryloxypropyltrichlorosilane, γ-(meth)acryloxypropylmethyldichlorosilane, γ-(meth)acryloxypropyldimethylchlorosilane, γ-(meth)acryloxypropyltripropoxysilane, γ-(meth)acryloxypropylmethyldipropoxysilane, γ-(meth)acryloxypropyltributoxysilane, γ-(meth)acryloxybutyltrimethoxysilane, γ-(meth)acryloxypentyltrimethoxysilane, γ-(meth)acryloxyhexyltrimethoxysilane, γ-(meth)acryloxyhexyltriethoxysilane, γ-(meth)acryloxyoctyltrimethoxysilane, γ-(meth)acryloxydecyltrimethoxysilane, γ-(meth)acryloxydodecyltrimethoxysilane, or γ-(meth)acryloxyoctadecyltrimethoxysilane; an amino group-containing (meth)acrylic acid ester, for example, dimethylaminoethyl (meth)acrylate; an alkoxy group-containing (meth)acrylic acid ester, for example, 2-methoxyethyl (meth)acrylate, butoxyethyl (meth)acrylate or methoxytriethylene glycol (meth)acrylate; and a carbonyl group-containing (meth)acrylic acid ester, for example, 2-(acetoacetoxy)ethyl (meth)acrylate.

The α-β unsaturated amide includes, for example, acrylamide, methacrylamide, N-methylolacrylamide, and butoxy N-methylolacrylamide.

The unsaturated hydrocarbon includes, for example, styrene, α-methyl styrene, vinyl toluene, dimethyl styrene, tert-butyl styrene, and divinylbenzene.

Compounds other than those described above, which can be used as the compound (C1) having a carbon-carbon unsaturated bond, includes, for example, vinyltrimethoxysilane, vinyltriethoxysilane, vinyltripropoxysilane, vinylmethyldimethoxysilane, vinylmethyldiethoxysilane, vinylmethyldipropoxysilane, tris(meth)acryloyloxy phosphate, diallyl terephthalate, tetraallyloxyethane, tri(meth)allyl isocyanurate, diacetone acrylamide, allyl acetoacetate, acrylonitrile, methacrylonitrile, sodium styrenesulfonate, vinyl acetate, vinyl propionate, neononanoic acid vinyl ester, neodecanoic acid vinyl ester, vinyl chloride, vinylidene chloride, alkyl vinyl ether, vinyl fluoride, vinylidene fluoride, trichloroethylene, tetrafluoroethylene, 2-chloropropene, 2-fluoropropene, hexafluoropropene, butadiene, isoprene, chloroprene, ethylene, maleic anhydride, methyl maleate, and sodium vinylsulfonate.

As the compound (C1) having a carbon-carbon unsaturated bond, one kind of compound may be used alone or combination of plural compounds may be used.

The compound (C1) having a carbon-carbon unsaturated bond preferably contains an α-β unsaturated carboxylic acid ester, and more preferably contains a (meth)acrylic acid ester.

The glass transition point of the resin obtained by subjecting the polymerizable compound (C) to emulsion polymerization can be calculated by using Fox equation. That is, it can be calculated from the calculation equation described below by using the glass transition point of each compound used in the emulsion polymerization and the mass fraction of each compound in the polymerizable compound (C). In the equation, Tg represents the glass transition point (unit: K) of the resin obtained, $Tg_1, Tg_2 \ldots Tg_n$ each represents the glass transition point (unit: K) of each compound, and $W_1, W_2 \ldots W_n$ each represents the mass fraction of each compound.

$$1/Tg = W_1/Tg_1 + W_2/Tg_2 + \ldots + W_n/Tg_n \quad \text{(Fox equation)}$$

The polymerizable compound (C) used in the present invention preferably has the glass transition point calculated by the Fox equation of −80° C. to 0° C. By controlling the glass transition point in the range described above, adhesiveness and durability of the adhesive agent are more excellent.

The total amount of the surfactant (A) and the surfactant (B) in the present invention is preferably 0.15 parts by mass or more, more preferably 0.5 parts by mass or more, still more preferably 1 part by mass or more, based on 100 parts by mass of the polymerizable compound (C). Also, it is preferably 20 parts by mass or less, more preferably 10 parts by mass or less, and still more preferably 8 parts by mass or less. By controlling it in the range described above, the occurrence of foam can be further suppressed and the wettability to a base material is more excellent.

The use amount of the surfactant (B) in the present invention is preferably 5 parts by mass or more, more preferably 10 parts by mass or more, based on 100 parts by mass of the surfactant (A). Also, it is preferably 200 parts by mass or less, more preferably 100 parts by mass or less, still more preferably 80 parts by mass or less, and particularly preferably 50 parts by mass or less. By controlling it in the range described above, the occurrence of foam is further suppressed, the wettability to a base material is more excellent, and higher adhesive strength is achieved.

The use amount of the surfactant (A) in the present invention is preferably 0.1 part by mass or more, more preferably 0.3 parts by mass or more, still more preferably 0.5 parts by mass or more, based on 100 parts by mass of the polymerizable compound (C). Also, it is preferably 15 parts by mass or less, more preferably 10 parts by mass or less, and still more preferably 8 parts by mass or less. By controlling it in the range described above, the occurrence of foam is further suppressed, the wettability to a base material is more excellent, and higher adhesive strength is achieved.

The use amount of the surfactant (B) in the present invention is preferably 0.05 parts by mass or more, more preferably 0.1 part by mass or more, still more preferably 0.3 parts by mass or more, based on 100 parts by mass of the polymerizable compound (C). Also, it is preferably 5 parts by mass or less, more preferably 3 parts by mass or less, and still more preferably 2 parts by mass or less. By controlling it in the range described above, the occurrence of foam is further suppressed, the wettability to a base material is more excellent, and higher adhesive strength is achieved.

The emulsion polymerization method for obtaining the aqueous resin dispersion for use in the present invention is not particularly limited as long as it is a method in which the polymerizable compound (C) is subjected to emulsion polymerization in the presence of the surfactant (A) represented by the general formula (I) and the surfactant (B) free from a radical-polymerizable substituent. As such an emulsion polymerization method, for example, a method in which the polymerizable compound (C) is added to an aqueous solution containing water, the surfactant (A) represented by the general formula (I) and the surfactant (B) free from a radical-polymerizable substituent is exemplified. As to the addition of the polymerizable compound (C), the total amount thereof may be added at once, it may be added dividedly in plural times or it may be added dropwise.

As another emulsion polymerization method, a method in which a pre-emulsion obtained by emulsifying in advance the surfactant (A) represented by the general formula (I), the surfactant (B) free from a radical-polymerizable substituent and the polymerizable compound (C) in water and an aqueous solution containing a polymerization initiator are mixed is exemplified. In the case of mixing the pre-emulsion with the aqueous solution containing a polymerization initiator, the total amount thereof may be mixed at once, at least one of them may be mixed dividedly in plural times or at least one of them may be added dropwise. The preparation method of the pre-emulsion is not particularly limited and includes, for example, a method in which the surfactant (A) represented by the general formula (I) and the surfactant (B) free from a radical-polymerizable substituent are dissolved in water, and the polymerizable compound (C) is added thereto, followed by stirring. Further, in the preparation of the pre-emulsion, an organic solvent miscible with water, for example, methanol may be used in combination therewith.

The reaction temperature in the emulsion polymerization method is not particularly limited and, for example, it is preferably from 50 to 100° C., more preferably from 60 to 95° C. The reaction temperature may be maintained constant from the start of the reaction or may be changed during the reaction. The reaction time in the emulsion polymerization method is not particularly limited, is able to be appropriately controlled based on the progress of the reaction, and is usually approximately from 2 to 9 hours.

In the emulsion polymerization, a protective colloid agent, a chain transfer agent, a polymerization initiator, and a crosslinking agent can be used.

The protective colloid agent includes, for example, completely saponified polyvinyl alcohol (PVA), partially saponified PVA, hydroxyethyl cellulose, carboxymethyl cellulose, methyl cellulose, polyacrylic acid, and polyvinylpyrrolidone. By performing the emulsion polymerization in the presence of the protective colloid agent, the polymerization stability can be further enhanced.

The chain transfer agent includes, for example, a mercaptan, for example, n-dodecyl mercaptan, octyl mercaptan, tert-butyl mercaptan, thioglycolic acid, thiomalic acid, or thiosalicylic acid, a sulfide, for example, diisopropyl xanthogen disulfide, diethyl xanthogen disulfide or diethyl thiuram disulfide, a halogenated hydrocarbon, for example, iodoform, diphenyl ethylene, p-chlorodiphenyl ethylene, p-cyanodiphenyl ethylene, and α-methyl styrene dimer. By performing the emulsion polymerization in the presence of the chain transfer agent, the molecular weight can be controlled.

The polymerization initiator includes, for example, a persulfate, for example, ammonium persulfate or potassium persulfate, a peroxide, for example, hydrogen peroxide or benzoyl peroxide, and a redox polymerization initiator in which a persulfate and a reducing agent, for example, an alkali metal sulfite or bisulfite are combined. The addition method of the polymerization initiator is not particularly limited and includes, for example, a method of adding the total amount thereof at once, a method of adding it dividedly in plural times and a method of adding it dropwise.

The crosslinking agent includes, for example, a complete alkyl type methylated melamine resin, for example, hexamethoxymethylated melamine resin, a partially alkylated methylated melamine resin, an amino resin, for example, a benzoguanamine resin or an alkyl-etherified urea resin, an isocyanate compound, for example, tolylene diisocyanate, diphenylmethane diisocyanate, triphenylmethane triisocyanate, xylylene diisocyanate, hydrogenated products thereof, hexamethylene diisocyanate, isophorone diisocyanate, dianisidine diisocyanate, or tolidine diisocyanate, a blocked isocyanate compound obtained by blocking the isocyanate group of the isocyanate compound described above, a phenolic resin, for example, a dimethylol resin, a poly methylol phenolic resin, a phenol formamide resin, a methylol phenol formamide resin, or a dimethylol phenolic formamide resin, an epoxy resin, for example, a polyglycidyl ether of polyvalent alcohol, for example, ethylene glycol diglycidyl ether, hexanediol diglycidyl ether, neopentyl glycol diglycidyl ether, glycerol diglycidyl ether, glycerol polyglycidyl ether, diglycerol polyglycidyl ether, sorbitol polyglycidyl ether, hydrogenated bisphenol A diglycidyl ether, or bisphenol A diglycidyl ether, p-oxybenzoic acid glycidyl ether, phthalic acid diglycidyl ester, hexahydrophthalic acid diglycidyl ester, a hydantoin ring-containing epoxy resin, or a vinyl polymer having an epoxy group in the side chain thereof, an aziridine compound, for example, tris-2,4,6-(1-aziridinyl)-1,3,5-triazine, tris[1-(2-methyl)aziridinyl]phosphine oxide or hexa[1-(2-methyl)aziridinyl]triphosphatriazine, an oxazoline ring-containing compound, an alkyd resin, an unsaturated polyester resin, and a polyvalent alcohol.

The adhesive agent composition of the present invention may contain a component other than the aqueous resin dispersion described above. Such a component includes, for example, a tackiness-improver agent, a wetting agent, an antifoaming agent, a foaming agent, a foam stabilizer, a thickener, a penetrating agent, a water repellent oil repellent agent, a plasticizer, a preservative, an antifungal agent, a germicide, a rust inhibitor, a chelating agent, an antioxidant, an ultraviolet absorber, a pH adjusting agent, a freeze-thaw stabilizer, a high boiling point solvent, a colorant, for example, an inorganic pigment or an organic pigment, a filler, metal powder, a humectant, an adhesion imparting agent, a vulcanizing agent, for example, zinc oxide, sulfur or a vulcanization accelerator, an anti-blocking agent, and a flame retardant.

A base material to which the adhesive agent composition of the present invention can be applied is not particularly limited and includes, for example, a plastic, for example, polyethylene, polypropylene, polystyrene, an ABS resin, an acrylic resin, polycarbonate, polyvinyl chloride, or polyethylene terephthalate, and in addition, rubber, wood, ceramic, glass, and metal.

The adhesive agent of the present invention is obtained by drying the adhesive agent composition described above.

EXAMPLE

The present invention will be described more specifically with reference to the Examples, but the present invention should not be construed as being limited to these Examples. The "%" therein indicates "% by mass" unless otherwise specified. Further, in the structural formulae, EO represents oxyethylene, and PO represents oxypropylene.

Surfactants (A-1) to (A-5) each represented by the general formula (I) were synthesized by the methods of Synthesis Examples 1 to 5 described below, respectively.

Synthesis Example 1

In a reaction vessel equipped with a stirrer, a thermometer and a reflux tube were charged 208 g (1.0 mol) of styrenated phenol (a mixture of monostyrenated phenol:distyrenated phenol:tristyrenated phenol=87:12:1 (mass ratio)), 40 g (1.0 mol) of sodium hydroxide and 210 g of acetone, and the internal temperature was raised to 40° C. with stirring. Then, 84 g (1.1 mol) of allyl chloride was added dropwise thereto over a period of one hour, and after the completion of the dropwise addition, the mixture was allowed to react at 40° C. for 2 hours. The reaction product was filtered to remove NaCl by-produced, allyl styrenated phenyl ether was then obtained by removing acetone under a reduced pressure, and 280 g of 2-allyl styrenated phenol was obtained by further allowing to react at 200° C. for 5 hours.

To an autoclave was transferred 280 g of the 2-allyl styrenated phenol obtained, followed by addition reaction with 220 g (5 mol) of ethylene oxide using potassium hydroxide as a catalyst under conditions of pressure of 0.15 MPa and temperature of 130° C., thereby obtaining polyoxyethylene propenyl styrenated phenyl ether.

Subsequently, the polyoxyethylene propenyl styrenated phenyl ether obtained was transferred to a reaction vessel equipped with a stirrer, a thermometer and a nitrogen inlet tube, and subjected to a reaction with 97 g (1 mol) of sulfamic acid in nitrogen atmosphere under condition of temperature of 120° C. Then, monoethanolamine was added to adjust pH of a 1% by weight aqueous solution to 7.5, followed by filtration to remove the salt formed, thereby obtaining Surfactant (A-1) represented by formula (1) shown below.

[Chem. 4]

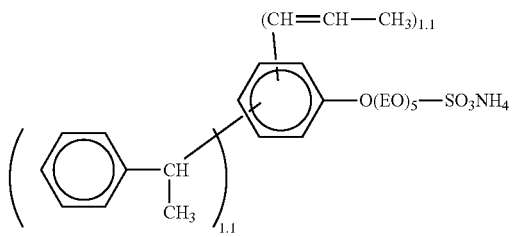

(1)

Synthesis Example 2

The same procedure as in Synthesis Example 1 was performed except for using 220 g (1.0 mol) of a mixture of monostyrenated phenol:distyrenated phenol:tristyrenated phenol=80:19:1 (mass ratio) as the styrenated phenol and changing the use amount of allyl chloride to 91 g (1.2 mol) and the use amount of ethylene oxide to 440 g (10 mol), thereby obtaining Surfactant (A-2) represented by formula (2) shown below.

[Chem. 5]

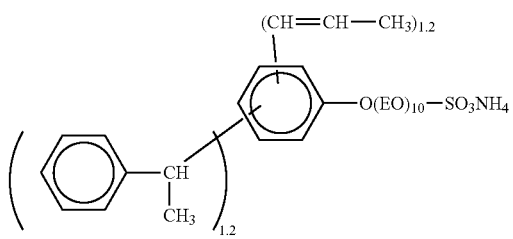

(2)

Synthesis Example 3

The same procedure as in Synthesis Example 1 was performed except for using 253 g (1.0 mol) of a mixture of monostyrenated phenol:distyrenated phenol:tristyrenated phenol=60:30:10 (mass ratio) as the styrenated phenol and changing the use amount of allyl chloride to 114 g (1.5 mol) and the use amount of ethylene oxide to 2,200 g (50 mol), thereby obtaining Surfactant (A-3) represented by formula (3) shown below.

[Chem. 6]

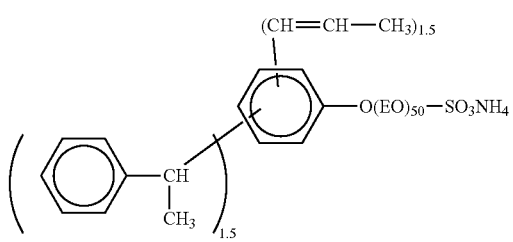

(3)

Synthesis Example 4

To an autoclave was transferred 310 g of the 2-allyl styrenated phenol obtained by the same procedure as in Synthetic Example 2, followed by addition reaction with 58 g (1 mol) of propylene oxide and then addition reaction with 440 g (10 mol) of ethylene oxide using potassium hydroxide as a catalyst under conditions of pressure of 0.15 MPa and temperature of 130° C., thereby obtaining polyoxyalkylene propenyl styrenated phenyl ether.

Subsequently, the polyoxyalkylene propenyl styrenated phenyl ether obtained was transferred to a reaction vessel equipped with a stirrer, a thermometer and a nitrogen inlet tube, and subjected to a reaction with 97 g (1 mol) of sulfamic acid in nitrogen atmosphere under condition of temperature of 120° C. Then, monoethanolamine was added to adjust pH of a 1% by weight aqueous solution to 7.5, followed by filtration to remove the salt formed, thereby obtaining Surfactant (A-4) represented by formula (4) shown below.

[Chem. 7]

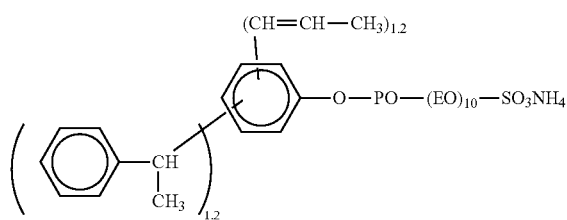

(4)

Synthesis Example 5

The same procedure as in Synthesis Example 2 was performed except for using 237 g (1.0 mol) of styrenated methylphenol (a mixture of monostyrenated methylphenol:distyrenated methylphenol:tristyrenated methylphenol=80:19:1 (mass ratio)) in place of the styrenated phenol, thereby obtaining Surfactant (A-5) represented by formula (5) shown below.

[Chem. 8]

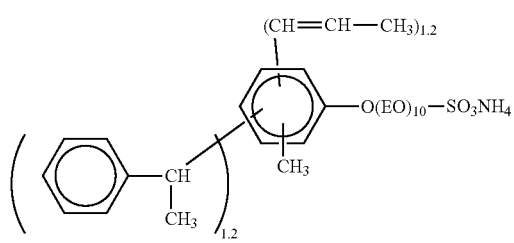

(5)

The compound shown below was used as a surfactant for Comparative Examples.
(a-1) Polyoxyethylene-1-(allyloxymethyl)nonylpropenyl-phenyl ether sulfate ester ammonium salt (trade name: HITENOLA-10, produced by DKS Co. Ltd.)
As the surfactant (B) free from a radical-polymerizable substituent, the compounds described below were used.

(B-1) Polyoxyethylene styrenated phenyl ether (trade name: NOIGEN EA-177, produced by DKS Co. Ltd.)
(B-2) Polyoxyalkylene branched decyl ether (trade name: NOIGEN XL-400D, produced by DKS Co. Ltd.)
(B-3) Polyoxyethylene tridecyl ether (trade name: NOIGEN TDS-2000, produced by DKS Co. Ltd.)
(B-4) Polyoxyethylene lauryl ether (trade name: DKS NL-180, produced by DKS Co. Ltd.)
(B-5) Polyoxyethylene oleyl cetyl ether (trade name: NOIGEN ET-18E, produced by DKS Co. Ltd.)
(B-6) Polyoxyalkylene branched decyl ether (trade name: EPAN 750, produced by DKS Co. Ltd.)
(B-7) Polyoxyethylene styrenated phenyl ether sulfate ester ammonium salt (trade name: HITENOL NF-13, produced by DKS Co. Ltd.)
(B-8) Polyoxyalkylene branched decyl ether sulfate ester ammonium salt (trade name: HITENOL XJ-160, produced by DKS Co. Ltd.)
(B-9) Polyoxyethylene lauryl ether sulfate ester ammonium salt (trade name: HITENOL LA-16, produced by DKS Co. Ltd.)
(B-10) Polyoxyethylene oleyl cetyl ether sulfate ester ammonium salt (trade name: HITENOL 18E, produced by DKS Co. Ltd.)
(B-11) Sodium straight-chain alkylbenzenesulfonate (trade name: NEOGEN S-20F, produced by DKS Co. Ltd.)
(B-12) Sodium dioctyl sulfosuccinate (trade name: NEOCOL P, produced by DKS Co. Ltd.)
(B-13) Polyoxyethylene styrenated phenyl ether phosphoric acid ester (trade name: PLYSURF AL, produced by DKS Co. Ltd.)

Production Examples 1 to 17 and Comparative Production Examples 1 to 7

The surfactant (A) and surfactant (B) having the kinds and amounts (g) shown in Table 1 or Table 2 were dissolved in 107.15 g of water. To this were added 123.75 g of butyl acrylate, 123.75 g of 2-ethylhexyl acrylate and 2.5 g of acrylic acid, as the compound having a carbon-carbon unsaturated bond, followed by emulsifying by a homomixer, thereby obtaining a pre-emulsion.

Separately, 117.11 g of water and 0.25 g of sodium hydrogen carbonate were charged to a flask equipped with a dropping funnel, a stirrer, a nitrogen gas inlet tube, a thermometer, and a reflux condenser, and 36.46 g of the pre-emulsion described above was added thereto, followed by temperature increase to 80° C. and mixing for 15 minutes. An aqueous solution prepared by dissolving 0.38 g of ammonium persulfate in 10 g of water as a polymerization initiator was added thereto to initiate reaction. From 15 minutes after the addition of the polymerization initiator, the remaining pre-emulsion was added dropwise over a period of 3 hours and allowed to react further for one hour. Subsequently, an aqueous solution prepared by dissolving 0.12 g of ammonium persulfate in 10 g of water was added and allowed to react for one hour, followed by cooling to 40° C. and adjusting pH to 8 with aqueous ammonia, thereby obtaining an aqueous resin dispersion. The glass transition temperature calculated by Fox equation was −62° C.

Production Example 18

An aqueous resin dispersion was obtained by performing the same procedure as in Production Example 1 excepting for using 25 g of butyl acrylate and 225 g of 2-ethylhexyl acrylate as the compound having a carbon-carbon unsaturated bond. The glass transition temperature calculated by Fox equation was −69° C.

Production Example 19

An aqueous resin dispersion was obtained by performing the same procedure as in Production Example 1 excepting for using 72.5 g of butyl acrylate, 50 g of 2-ethylhexyl acrylate, 125 g of styrene, and 2.5 g of acrylic acid as the compound having a carbon-carbon unsaturated bond. The glass transition temperature calculated by Fox equation was −1° C.

As to the aqueous resin dispersions obtained, copolymerizability of the surfactant (A), polymerization stability, average particle diameter, polydispersity, chemical stability, and mechanical stability were evaluated. The results obtained are shown in Table 1 and Table 2.

[Copolymerizability of Surfactant (A)]

The aqueous resin dispersion was diluted 5 times with methanol. The resulting diluted solution was subjected to ultracentrifugation treatment (trade name: himac CS 120FX, produced by Hitachi Koki Co., Ltd.) to separate a resin and a supernatant liquid and the supernatant liquid was collected. The supernatant liquid obtained was measured by a high performance liquid chromatography equipped with an UV detector to calculate a weight of the surfactant (A) which had not been polymerized by using a calibration curve method, and a polymerization rate of the surfactant (A) was calculated according to the equation shown below. As the polymerization rate of the surfactant (A) increases, the property is good, and the evaluation was conducted according to the criteria shown below.

$$\text{Polymerization rate (\%) of surfactant}(A) = \frac{(\text{Weight of surfactant}(A) \text{ used}) - (\text{Weight of surfactant}(A) \text{ not polymerized})}{(\text{Weight of surfactant}(A) \text{ used})} \times 100 \quad [\text{Math. 1}]$$

○: The polymerization rate of the surfactant (A) is 80% or more.
X: The polymerization rate of the surfactant (A) is 40% or more but less than 80%.
XX: The polymerization rate of the surfactant (A) is less than 40%.

[Polymerization Stability]

100 g of the aqueous resin dispersion was filtered through a 200-mesh metal gauze and then the residue was washed with water and the residue was dried at 105° C. for 2 hours. Subsequently, the weight of the dried product was measured and the aggregate concentration (% by weight) in the aqueous resin dispersion was calculated. Separately, 1 g of the aqueous resin dispersion was dried at 105° C. for 2 hours, the weight of the dried product was measured and the solid content concentration (% by weight) in the aqueous resin dispersion was calculated. By using the aggregate concentration and solid content concentration thus-calculated, a ratio of the aggregate was calculated according to the equation shown below. As the ratio of aggregate decreases, the polymerization stability is high.

(Ratio of aggregate (% by weight))=[(Aggregate concentration)/(Solid content concentration)]× 100

[Average Particle Diameter]

The average particle diameter (nm) of the aqueous resin dispersion was measured by using a dynamic light scattering particle size distribution analyzer (produced by Nikkiso Co., Ltd., product name: MICROTRAC UPA9340). The average particle diameter is a median diameter of d50.

[Polydispersity]

The three kinds of the average particle diameter (nm) of the aqueous resin dispersion were measured by using a dynamic light scattering particle size distribution analyzer (produced by Nikkiso Co., Ltd., product name: MICROTRAC UPA9340) and the polydispersity was calculated according to the calculation equation shown below.

Polydispersity=$(d90-d10)/d50$ d90: Particle diameter corresponding to 90% of the volume distribution cumulative amount in the particle diameter distribution curve
d10: Particle diameter corresponding to 10% of the volume distribution cumulative amount in the particle diameter distribution curve
d50: Particle diameter (median diameter) corresponding to 50% of the volume distribution cumulative amount in the particle diameter distribution curve

[Chemical Stability]

To 10 g of the aqueous resin dispersion was added 10 ml of an aqueous calcium chloride solution having a predetermined concentration, followed by stirring for 5 minutes. Then the occurrence or non-occurrence of aggregate was confirmed by visual observation. The concentration of the aqueous calcium chloride solution was set to 0.5 mol/L, 1.0 mol/L or 2.0 mol/L and the lowest concentration at which the aggregate occurred was determined. As the numerical value increases, the chemical stability is high and the evaluation was conducted according to the criteria shown below.

○○: 2.0 mol/L or non-occurrence of aggregate
○: 1.0 mol/L
X: 0.5 mol/L

[Mechanical Stability]

50 g of the aqueous resin dispersion was treated in a Marlon type tester under a load of 10 kg at a rotation number of 1,000 rpm for 5 minutes. The resulting treated solution was filtered through a 100-mesh metal gauze, and the residue was washed with water and then dried at 105° C. for 2 hours to collect the aggregate. The weight of the aggregate was measured and the ratio of aggregate (% by weight) was calculated in the same manner as in the polymerization stability. As the numerical value decreases, the mechanical stability is high.

TABLE 1

|  |  | Production Ex. 1 | Production Ex. 2 | Production Ex. 3 | Production Ex. 4 | Production Ex. 5 | Production Ex. 6 |
|---|---|---|---|---|---|---|---|
| Surfactant | A-1 |  | 4.0 |  |  |  |  |
| (A) | A-2 | 4.0 |  | 4.0 |  |  |  |
|  | A-3 |  |  |  |  |  |  |
|  | A-4 |  |  |  | 4.0 |  |  |
|  | A-5 |  |  |  |  | 4.0 | 4.0 |

TABLE 1-continued

|  |  | | | | | | |
|---|---|---|---|---|---|---|---|
| Surfactant (B) | B-1 | 1.0 | | | | | |
|  | B-2 | | 1.0 | | | | |
|  | B-3 | | | 1.0 | | | |
|  | B-4 | | | | 1.0 | | |
|  | B-5 | | | | | 1.0 | |
|  | B-6 | | | | | | 1.0 |
|  | B-7 | | | | | | |
|  | B-8 | | | | | | |
|  | B-9 | | | | | | |
|  | B-10 | | | | | | |
|  | B-11 | | | | | | |
|  | B-12 | | | | | | |
|  | B-13 | | | | | | |
| Evaluation of Aqueous Resin Dispersion | Copolymerizability of Reactive Surfactant | ○ | ○ | ○ | ○ | ○ | ○ |
|  | Polymerization Stability, % by weight | <0.01 | 0.01 | 0.01 | <0.01 | 0.01 | 0.02 |
|  | Average Particle Diameter, nm | 150 | 155 | 157 | 153 | 151 | 160 |
|  | Polydispersity | 0.20 | 0.22 | 0.26 | 0.19 | 0.23 | 0.21 |
|  | Chemical Stability | ○○ | ○○ | ○○ | ○○ | ○○ | ○○ |
|  | Mechanical Stability, % by weight | 0.01 | <0.01 | 0.01 | 0.01 | 0.02 | <0.01 |

|  |  | Production Ex. 7 | Production Ex. 8 | Production Ex. 9 | Production Ex. 10 | Production Ex. 11 | Production Ex. 12 | Production Ex. 13 |
|---|---|---|---|---|---|---|---|---|
| Surfactant (A) | A-1 | | | | 4.0 | | | |
|  | A-2 | 4.0 | | | | | 4.0 | |
|  | A-3 | | 4.0 | | | | | |
|  | A-4 | | | | | 4.0 | | 4.0 |
|  | A-5 | | | 4.0 | | | | |
| Surfactant (B) | B-1 | | | | | | | |
|  | B-2 | | | | | | | |
|  | B-3 | | | | | | | |
|  | B-4 | | | | | | | |
|  | B-5 | | | | | | | |
|  | B-6 | | | | | | | |
|  | B-7 | 1.0 | | | | | | |
|  | B-8 | | 1.0 | | | | | |
|  | B-9 | | | 1.0 | | | | |
|  | B-10 | | | | 1.0 | | | |
|  | B-11 | | | | | 1.0 | | |
|  | B-12 | | | | | | 1.0 | |
|  | B-13 | | | | | | | 1.0 |
| Evaluation of Aqueous Resin Dispersion | Copolymerizability of Reactive Surfactant | ○ | ○ | ○ | ○ | ○ | ○ | ○ |
|  | Polymerization Stability, % by weight | <0.01 | 0.01 | 0.01 | 0.02 | <0.01 | 0.01 | 0.01 |
|  | Average Particle Diameter, nm | 155 | 165 | 151 | 144 | 152 | 156 | 152 |
|  | Polydispersity | 0.25 | 0.22 | 0.20 | 0.17 | 0.16 | 0.19 | 0.20 |
|  | Chemical Stability | ○ | ○ | ○ | ○ | ○ | ○ | ○ |
|  | Mechanical Stability, % by weight | 0.01 | 0.01 | <0.01 | 0.01 | 0.02 | 0.02 | 0.01 |

TABLE 2

|  |  | Production Ex. 14 | Production Ex. 15 | Production Ex. 16 | Production Ex. 17 | Production Ex. 18 | Production Ex. 19 |
|---|---|---|---|---|---|---|---|
| Surfactant (A) | A-2 | 4.5 | 3.5 | 2.0 | 12.0 | 4.0 | 4.0 |
| Surfactant (B) | B-1 | 0.5 | 1.5 | 0.5 | 3.0 | 1.0 | 1.0 |
|  | B-2 | | | | | | |

TABLE 2-continued

|  |  | | | | | | |
|---|---|---|---|---|---|---|---|
|  | B-3 | | | | | | |
|  | B-4 | | | | | | |
|  | B-7 | | | | | | |
|  | B-9 | | | | | | |
| Other Surfactant | a-1 | | | | | | |
| Evaluation of Aqueous Resin Dispersion | Copolymerizability of Reactive Surfactant | ○ | ○ | ○ | ○ | ○ | ○ |
|  | Polymerization Stability, % by weight | <0.01 | 0.02 | 0.05 | 0.12 | 0.01 | 0.01 |
|  | Average Particle Diameter, nm | 149 | 165 | 178 | 130 | 152 | 153 |
|  | Polydispersity | 0.24 | 0.28 | 0.30 | 0.22 | 0.21 | 0.20 |
|  | Chemical Stability | ○○ | ○○ | ○○ | ○○ | ○○ | ○○ |
|  | Mechanical Stability, % by weight | <0.01 | 0.01 | 0.01 | 0.02 | 0.01 | 0.01 |

|  |  | Com. Production Ex. 1 | Com. Production Ex. 2 | Com. Production Ex. 3 | Com. Production Ex. 4 | Com. Production Ex. 5 | Com. Production Ex. 6 | Com. Production Ex. 7 |
|---|---|---|---|---|---|---|---|---|
| Surfactant (A) | A-2 | 5.0 | | | | | | |
| Surfactant (B) | B-1 | | | | 5.0 | | | |
|  | B-2 | | | 1.0 | | | | |
|  | B-3 | | | | | 5.0 | | |
|  | B-4 | | | | | | | 1.0 |
|  | B-7 | | | | | | 5.0 | |
|  | B-9 | | | | | | | 4.0 |
| Other Surfactant | a-1 | | 5.0 | 4.0 | | | | |
| Evaluation of Aqueous Resin Dispersion | Copolymerizability of Reactive Surfactant | ○ | ○ | ○ | — | — | — | — |
|  | Polymerization Stability, % by weight | <0.01 | 0.02 | 0.01 | 0.13 | 0.15 | 0.01 | 0.02 |
|  | Average Particle Diameter, nm | 150 | 156 | 153 | 176 | 180 | 158 | 153 |
|  | Polydispersity | 0.20 | 0.26 | 0.27 | 0.40 | 0.38 | 0.27 | 0.25 |
|  | Chemical Stability | ○ | ○ | ○○ | ○○ | ○○ | ○ | ○○ |
|  | Mechanical Stability, % by weight | 0.01 | <0.01 | 0.01 | 0.30 | 0.36 | 0.30 | 0.40 |

Examples 1 to 19 and Comparative Examples 1 to 7

The aqueous resin dispersions described in Table 1 and Table 2 were used as the adhesive agent compositions. That is, the adhesive agent composition was applied on a PET film (width: 2.5 cm) so as to have a wet film thickness of 52 μm, followed by drying at 105° C. for 30 minutes. Subsequently, an SUS plate was stuck on the surface of the adhesive agent and pressed with roller, followed by curing at 20° C. and 40% RH for 24 hours, thereby obtaining a test piece. The evaluations were performed with respect to low foaming property, wettability, water resistance adhesive strength, and peeling property according to the methods described below. The results obtained are shown in Table 3 to Table 5.

[Low Foaming Property]

20 ml of the adhesive agent composition and 10 ml of water were put into a 100-ml Nessler tube, followed by inverting 50 times and then allowing to stand. An amount of foam (mL) after 5 minutes was measured. As the amount of foam decreases, the property is good and the evaluation was conducted according to the criteria shown below.

○○: Amount of foam is less than 2 mL.
○: Amount of foam is 2 ml or more but less than 10 mL.
X: Amount of foam is 10 ml or more.

[Wettability]

By using one obtained by diluting the adhesive agent composition twice with water, surface tension (mN/m) at 25° C. was measured by a Wilhelmy type surface tension meter. As the surface tension decreases, the wettability to a base material is high and the evaluation was conducted according to the criteria shown below.

○: Surface tension is less than 47 mN/m.
X: Surface tension is 47 mN/m or more.

[Water Resistance Adhesive Strength]

The test piece was immersed in pure water at 25° C. for 24 hours and then water on the surface of test piece was removed. By using this test piece, 180-degree peel test (rate: 50 mm/minute) was performed by using an autograph in accordance with JIS Z0237 (2009). As the value increases, the property is good and the evaluation was conducted according to the criteria shown below.

○○: Adhesive strength is 10 N/25 mm or more.
○: Adhesive strength is 5 N/25 mm or more but less than 10 N/25 mm.
X: Adhesive strength is less than 5 N/25 mm.

[Peeling Property]

The adhesive surface after the measurement of water resistance adhesive strength was visually observed and evaluated according to the criteria shown below.

○○: Adhesive agent is not attached to the SUS plate.
○: Adhesive agent is slightly attached to the SUS plate.
X: Adhesive agent is attached to the entire of the SUS plate.

aqueous resin dispersion using only the surfactant (B) as in Comparative Examples 4 to 7, it can be seen that the occurrence of foam is recognized and the water resistance adhesive strength and the peeling property are poor. Further, in the case of containing an aqueous resin dispersion using other surfactant (a) having a radical-polymerizable substituent in place of the surfactant (A) as in Comparative Example 2, it can be seen that the wettability to a base material is poor. In the case of containing an aqueous resin dispersion using the other surfactant (a) described above and the surfactant (B) as in Comparative Example 3, it can be seen that the occurrence of foam is recognized and the water resistance adhesive strength and the peeling property are poor.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Aqueous Resin Dispersion | Production Ex. 1 | Production Ex. 2 | Production Ex. 3 | Production Ex. 4 | Production Ex. 5 | Production Ex. 6 | Production Ex. 7 | Production Ex. 8 | Production Ex. 9 | Production Ex. 10 |
| Low Foaming Property | ○○ | ○○ | ○○ | ○○ | ○○ | ○○ | ○○ | ○○ | ○○ | ○○ |
| Wettability | ○ | ○ | ○ | ○ | ○ | ○ | ○ | ○ | ○ | ○ |
| Water Resistance Adhesive Strength | ○○ | ○○ | ○○ | ○○ | ○○ | ○○ | ○○ | ○○ | ○○ | ○○ |
| Peeling Property | ○ | ○ | ○ | ○ | ○ | ○ | ○ | ○ | ○ | ○ |

TABLE 4

|  | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| Aqueous Resin Dispersion | Production Ex. 11 | Production Ex. 12 | Production Ex. 13 | Production Ex. 14 | Production Ex. 15 | Production Ex. 16 | Production Ex. 17 | Production Ex. 18 | Production Ex. 19 |
| Low Foaming Property | ○○ | ○○ | ○○ | ○○ | ○○ | ○○ | ○○ | ○○ | ○○ |
| Wettability | ○ | ○ | ○ | ○ | ○ | ○ | ○ | ○ | ○ |
| Water Resistance Adhesive Strength | ○○ | ○○ | ○○ | ○○ | ○○ | ○○ | ○ | ○ | ○ |
| Peeling Property | ○ | ○ | ○ | ○ | ○ | ○ | ○ | ○ | ○ |

TABLE 5

|  | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|
| Aqueous Resin Dispersion | Com. Production Ex. 1 | Com. Production Ex. 2 | Com. Production Ex. 3 | Com. Production Ex. 4 | Com. Production Ex. 5 | Com. Production Ex. 6 | Com. Production Ex. 7 |
| Low Foaming Property | ○○ | ○○ | X | X | X | X | X |
| Wettability | X | X | ○ | ○ | ○ | ○ | ○ |
| Water Resistance Adhesive Strength | ○ | ○ | X | X | X | X | X |
| Peeling Property | ○ | ○ | X | X | X | X | X |

From the results described above, it can be seen that since the adhesive agent composition of the present invention contains an aqueous resin dispersion obtained by subjecting the polymerizable compound (C) to emulsion polymerization in the presence of the surfactant (A) and the surfactant (B), the occurrence of foam is suppressed and the wettability to a base material and the water resistance adhesive strength are excellent. On the other hand, in the case of containing an aqueous resin dispersion using only the surfactant (A) as in Comparative Example 1, it can be seen that the wettability to a base material is poor. In the case of containing an

INDUSTRIAL APPLICABILITY

Since the adhesive agent composition of the present invention is excellent in the water resistance adhesive strength, it can be used as an adhesive agent for buildings, bridges, exterior materials of housing, furniture, automobiles, interior and exterior materials of transport vehicles, and the like.

While the present invention has been described in detail and with reference to specific embodiments thereof, it will be apparent to one skilled in the art that various changes and modifications can be made therein without departing from the spirit and scope of the present invention.

The present application is based on a Japanese patent application No. 2014-229347 filed on Nov. 11, 2014, the content thereof being incorporated herein by reference.

The invention claimed is:

1. An adhesive agent composition, comprising an aqueous resin dispersion obtained by subjecting a polymerizable compound (C) comprising a compound (C1) having a carbon-carbon unsaturated bond to an emulsion polymerization in the presence of a surfactant (A) represented by formula (I) and a surfactant (B) free from a radical-polymerizable substituent:

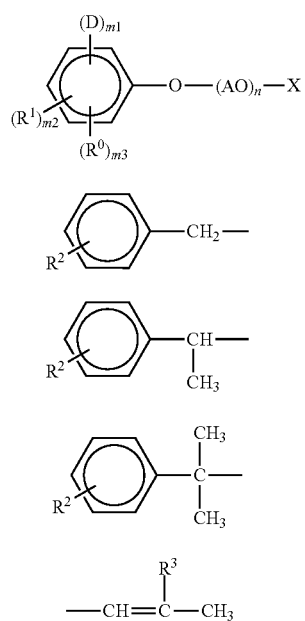

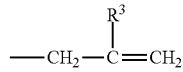

wherein in formula (I), $R^0$ represents an alkyl group having a carbon number of from 1 to 4;

$R^1$ represents at least one group selected from $R^1$-1, $R^1$-2, and $R^1$-3, wherein $R^2$ represents a hydrogen atom or a methyl group;

D represents D-1 or D-2, wherein $R^3$ represents a hydrogen atom or a methyl group;

m1 represents a number of from 1 to 2;

m2 represents a number of from 1 to 3;

m3 represents a number of 0 or 1;

AO represents an oxyalkylene group having a carbon number of from 2 to 4;

n is an average addition molar number of alkylene oxide and represents a number in a range of from 0 to 1,000; and X represents a group selected from —$(CH_2)_a$—$SO_{3M}$, —$(CH_2)_b$—COOM, —$PO_3M_2$, —$P(Z)O_2M$, and —CO—$CH_2$—$CH(SO_3M)$-COOM, wherein a and b each represents a number of from 0 to 4, Z represents a residue obtained by eliminating X from formula (I), and M each represents a hydrogen atom, an alkali metal atom, an alkaline earth metal atom, an alkyl ammonium, an alkanol ammonium, or an ammonium; and wherein surfactant (B) is polyoxyalkylene styrenated phenyl ether.

2. The adhesive agent composition according to claim 1, wherein when compound (C) is subjected to emulsion polymerization in the presence of surfactants (A) and (B), surfactants (A) and (B) are present in a ratio of 5 to 80 parts by mass surfactant (B) to 100 parts by mass surfactant (A).

3. An adhesive agent, obtained by drying the adhesive agent composition according to claim 1.

4. An adhesive agent, obtained by drying the adhesive agent composition according to claim 2.

* * * * *